S. T. Parmelee,
Shoe Heel,

№ 13,272. Patented July 17, 1855.

UNITED STATES PATENT OFFICE.

S. T. PARMELEE, OF NEW BRUNSWICK, NEW JERSEY.

ATTACHING METALLIC HEELS TO INDIA-RUBBER SOLES.

Specification of Letters Patent No. 13,272, dated July 17, 1855.

*To all whom it may concern:*

Be it known that I, S. T. PARMELEE, of New Brunswick, in the county of Middlesex and State of New Jersey, have invented a new and Improved Mode of Constructing or Forming Metallic Heels for India-Rubber Boots and Shoes; and I do hereby declare that the following is a full, clear, and exact description of the same, reference being had to the annexed drawings, making a part of this specification, in which—

Figure 2:
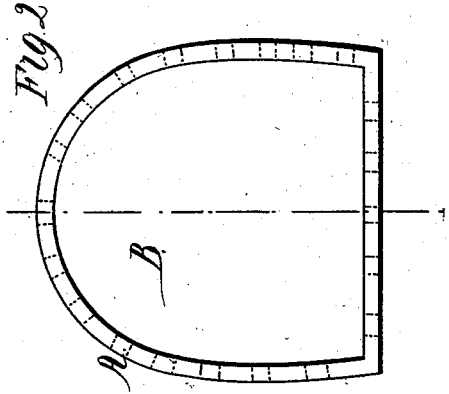
Figure 1:
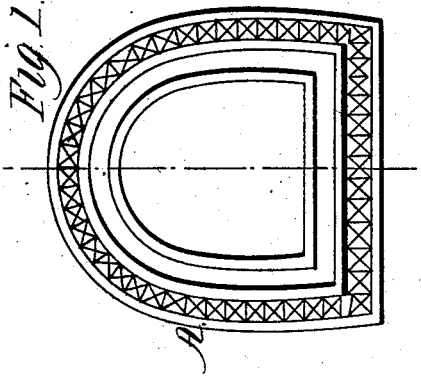
Figure 5:
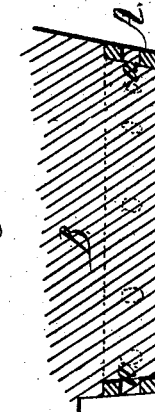
Figure 4:
Figure 3:

Figures 1 and 2 are bottom views of two metallic heels, Fig. 2, having the india rubber filling within it, and Fig. 1, showing only the metal, the filling not being attached or placed within it. Figs. 3, 4 and 5 are transverse vertical sections of ditto, (*x*), (*x*), Figs. 1 and 2, showing the plane of section.

Similar letters of reference indicate corresponding parts in the several figures.

This invention relates to a new and improved mode of constructing heels for india rubber boots and shoes.

The nature of my invention consists in having the metallic heels formed with recesses arranged in any proper way and fitting the india rubber portion of the heel, and vulcanizing the same while in a soft state within the metallic portion, the recesses being so arranged as to hold or secure the india rubber to the metallic portion of the heel, as will be presently shown and described.

To enable others skilled in the art to fully understand and construct my invention I will proceed to describe it.

A, represents the metallic portions of the heels. These parts or portions A, are rims or cases constructed of chilled cast iron and having recesses (*a*) formed in them on their upper edges or inner sides so that the india rubber B, may fit therein and the rubber and metal be secured or locked together by means of a dovetail. Various forms of dovetail may be used. Three different forms are shown in Figs. 3, 4 and 5, and various modifications of these may be adopted. All that is required is to form the dovetail so that the rubber and metal may be permanently locked together.

The rubber B, is made soft or plastic by heat or other means and the vulcanizing materials added or mixed with it, and it is then fitted in the metallic rims or cases A. The rubber is then subjected to steam heat as usual and the rubber is vulcanized within the metallic rims or casings. The rubber B, is attached to the boot or shoe by any proper cement, the rubber projecting some distance above the upper surfaces of the rims or casings see Figs. 3, 4 and 5.

The india rubber could not be attached to or fitted within the rims or casings A, after being vulcanized as the rubber cannot be rendered sufficiently soft or plastic to be fitted within the rims or casings. And it is essential that the india rubber be vulcanized as it is much less subject to be be affected by heat, more durable and far preferable in every respect than the raw material.

I am aware that india rubber has been previously inserted within metallic casings in order to form heels for boots and shoes, and these have been used for ordinary leather boots, in order to form elastic heels, but they did not come into general use on account of the india rubber soon becoming injured or impaired by moisture, heat, and other causes which affect the raw material.

I do not claim the mere insertion of india rubber within metallic rims or casings for the purpose of forming the heels of boots and shoes for that has been previously done, but,

What I claim as new and desire to secure by Letters Patent, is—

Having the metallic rims or casings A, formed with recesses (*a*) arranged in any proper way so that the soft or plastic india rubber B, mixed with the proper vulcanizing materials may be fitted therein and the rubber and rims or casings be permanently locked together by subjecting the rubber to steam heat and vulcanizing it when fitted within the rims or casings for the purpose as set forth.

S. T. PARMELEE.

Witnesses:
J. W. COOMBS,
WM. TUSCH.